US009369348B2

(12) United States Patent
Gordon et al.

(10) Patent No.: US 9,369,348 B2
(45) Date of Patent: Jun. 14, 2016

(54) OUTAGE REPORTING

(71) Applicant: Bank of America Corporation, Charlotte, NC (US)

(72) Inventors: Candace R. Gordon, Jacksonville, FL (US); Jackie McCoy-Rangel, Indian Land, SC (US)

(73) Assignee: Bank of America Corporation, Charlotte, NC (US)

( * ) Notice: Subject to any disclaimer, the term of this patent is extended or adjusted under 35 U.S.C. 154(b) by 137 days.

(21) Appl. No.: 14/202,833

(22) Filed: Mar. 10, 2014

(65) Prior Publication Data

US 2015/0256422 A1   Sep. 10, 2015

(51) Int. Cl.
*G06F 15/173* (2006.01)
*H04L 12/24* (2006.01)

(52) U.S. Cl.
CPC ............ *H04L 41/22* (2013.01); *H04L 41/5074* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 8,462,014 | B1* | 6/2013 | Kardos | ................. | H02J 13/001 340/870.02 |
| 2004/0061616 | A1* | 4/2004 | Fischer | ..................... | G06F 1/30 340/657 |
| 2005/0050377 | A1* | 3/2005 | Chan | ................... | H04L 63/1433 714/4.3 |
| 2008/0068217 | A1* | 3/2008 | Van Wyk | ............... | G01D 4/004 340/870.11 |
| 2008/0089225 | A1* | 4/2008 | Ammay | .............. | H04L 41/0681 370/216 |
| 2009/0031174 | A1* | 1/2009 | Moon | ................. | G06F 11/0709 714/47.3 |
| 2009/0245094 | A1* | 10/2009 | Russell | ................. | H04L 41/069 370/216 |
| 2010/0246421 | A1* | 9/2010 | Marshall | ............... | H04L 43/065 370/252 |
| 2011/0218686 | A1* | 9/2011 | McHann, Jr. | ....... | H02J 13/0086 700/286 |
| 2012/0109545 | A1* | 5/2012 | Meynardi | ............ | H02J 13/0006 702/58 |
| 2013/0086194 | A1* | 4/2013 | Estes | .................... | G06F 11/0709 709/207 |
| 2013/0116843 | A1* | 5/2013 | Kim | ................. | G06Q 10/06375 700/292 |
| 2013/0138367 | A1* | 5/2013 | Boivin | ................... | G01R 31/08 702/59 |
| 2014/0257913 | A1* | 9/2014 | Ball | ..................... | G01C 21/343 705/7.25 |

* cited by examiner

*Primary Examiner* — Saket K Daftuar
(74) *Attorney, Agent, or Firm* — Banner & Witcoff, Ltd.; Michael A. Springs

(57) ABSTRACT

A user interface can include an outage reporting section which has the option of adding of an outage by requesting outage information from the user and receiving the outage information from the user. An existing outage can also be viewed by providing the user with a search field for selecting an existing outage. The user interface can be configured to display information regarding the selected existing outage. The outage information from the user can be stored in a centralized database for viewing at a later time. A series of questions regarding the outage can presented to the user at a user interface, and the series of questions may include at least one drop-down menu with predetermined answers.

20 Claims, 5 Drawing Sheets

OUTAGE REPORTING

FIELD

Aspects of the disclosure generally relate to collecting platform outage information. More specifically, aspects of the disclosure provide example methods and example apparatuses for a user interface for entering, reporting, and displaying of outage information

BACKGROUND

Reporting and tracking of platform outage information of database servers, e.g. database servers, ETL servers, Teradata servers, and warehouse databases can be challenging where multiple users are entering in data regarding various outages across various systems. For example, the use of multiple spreadsheets for the entry of outages and the multiple users that may be responsible for entering the outage information can result in many instances of non-matching data and data entry errors into the outage reporting data. Additionally, the multiple spreadsheets will need to be reconciled in order to assess system issues. The outage information and statistics may be used to trouble shoot and for generally solving system errors along with the reviewing of service level agreements ("SLAs") and vendor requirements to determine vendor responsibility so it is imperative that the outage information reported is accurate.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

An example method can include providing a user interface that includes an outage reporting section that may include the option of adding of an outage by requesting outage information from the user regarding a platform outage and receiving the outage information from the user or viewing of an existing outage by providing the user with a search field for selecting an existing outage and displaying information regarding the selected existing outage. The outage reporting process may include requesting outage statistics from a user, receiving the outage statistics from the user, and generally collecting all outage statistics for later viewing and analysis.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of examples various examples in which the disclosure may be practiced. It is to be understood that other embodiments may be utilized and structural and functional modifications may be made without departing from the scope of the present disclosure. The disclosure is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. For example, the use of "including" and "comprising" and variations thereof is meant to encompass the items listed thereafter and equivalents thereof as well as additional items and equivalents thereof, and the use of the terms "mounted," "connected," "coupled," "positioned," "engaged" and similar terms, is meant to include both direct and indirect mounting, connecting, coupling, positioning and engaging.

As noted above, various aspects of the disclosure relate to outage reporting. Before discussing these aspects in greater detail, however, several examples of network architectures and data processing devices that may be used in implementing various aspects of the disclosure will first be discussed.

Figure 1:
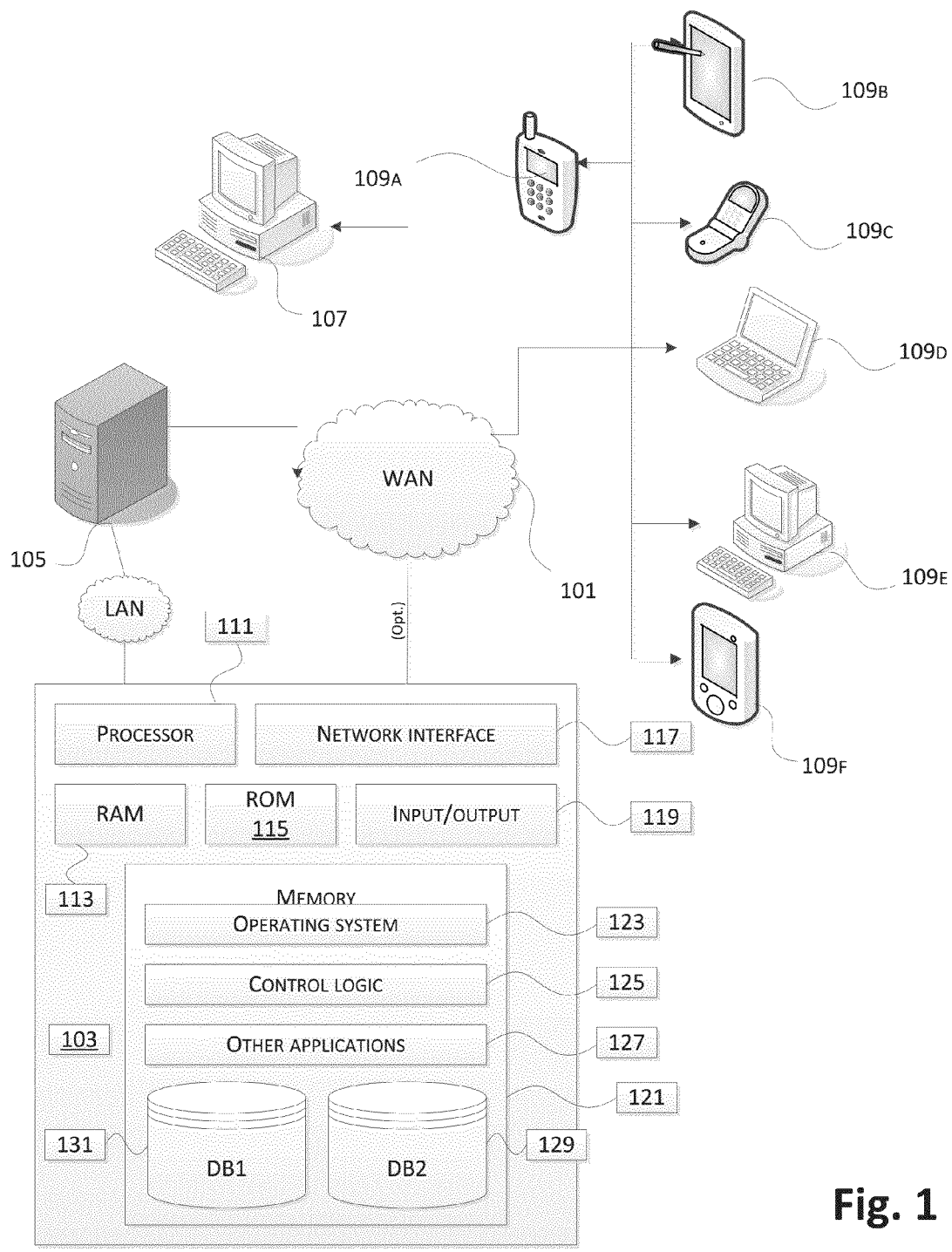
FIG. 1 illustrates one example of a network architecture and data processing device that may be used to implement one or more illustrative aspects discussed herein.

FIG. 1 illustrates one example of a network architecture and data processing device that may be used to implement one or more illustrative aspects. Various network nodes 103, 105, 107, and 109A-F may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109A-F and other devices (not shown) may be connected to one or more of the networks via twisted pair wires, coaxial cable, fiber optics, radio waves or other communication media. For example, the above connections can be made via the internet, blue tooth, WiFi, infrared, or any other known method of wireless transmission.

As shown in FIG. 1, devices 109A-F may include personal computers such as desktops, laptops, notebooks, mobile telephones or smartphones with applications and other functionality, a handheld device with Wi-Fi or other wireless connectivity (e.g., wireless enabled tablets, tablet computers, PDAs, and the like), displays with built-in or external memories and processors, or any other known computer, computing device, or handheld computer can also be connected to one or more of the networks described herein. It is also contemplated that other types of devices such as ATMs, kiosks, and other devices can be connected to one or more of the networks described herein. These devices can be enabled to communicate with wireless access points which in one example can be a series of cellular towers hosted by a service provider. Additionally, the wireless access points may be Wi-Fi (e.g., compatible with IEEE 802.11a/b/g/ and the like wireless communication standards) connections and the computing devices may obtain access to the Internet at these connections. Other known techniques may be used to allow devices to connect with a network.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, and devices 109a-f. Data server 103 provides overall access, control and administration of databases and control software for performing one or more illustrative aspects as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, devices 109a-f, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 or devices 109a-f a user may access web server 105 using an Internet browser, as is known in the art, or by executing a software application or app that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device as discussed herein. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, or the like.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects as described herein, and other application software 127 providing secondary, support, and/or other functionality which may or may not be used in conjunction with one or more aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, or the like).

Memory 121 may also store data used in performance of one or more aspects, including a first database 129 and a second database 131. In some embodiments, the first database may include the second database (e.g., as a separate table, report, or the like). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109a-f) as described herein may be spread across multiple data processing devices, for example, to distribute processing load across multiple computers, to segregate transactions based on geographic location, user access level, quality of service (QoS), or the like.

One or more aspects may be embodied in computer-usable or readable data and/or computer-executable instructions, such as in one or more program modules, executed by one or more computers or other devices as described herein. Generally, program modules include routines, programs, objects, components, data structures, or the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, or the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Another exemplary embodiment can include an outage entering and reporting process, which can be implemented by one or more systems, devices, or computer readable media as described herein. The outage entering and reporting process can be used to report platform outage information of database servers that house data pertaining to decision support analytics, e.g. database servers, ETL servers, Teradata servers, and warehouse databases. However, the outage entering and reporting process also could be used in conjunction with reporting and entering outage statistics on any database server. The outage reporting process can include requesting outage statistics from a user, receiving the outage statistics from the user, and generally collecting all outage statistics for later viewing and analysis.

Figure 4:
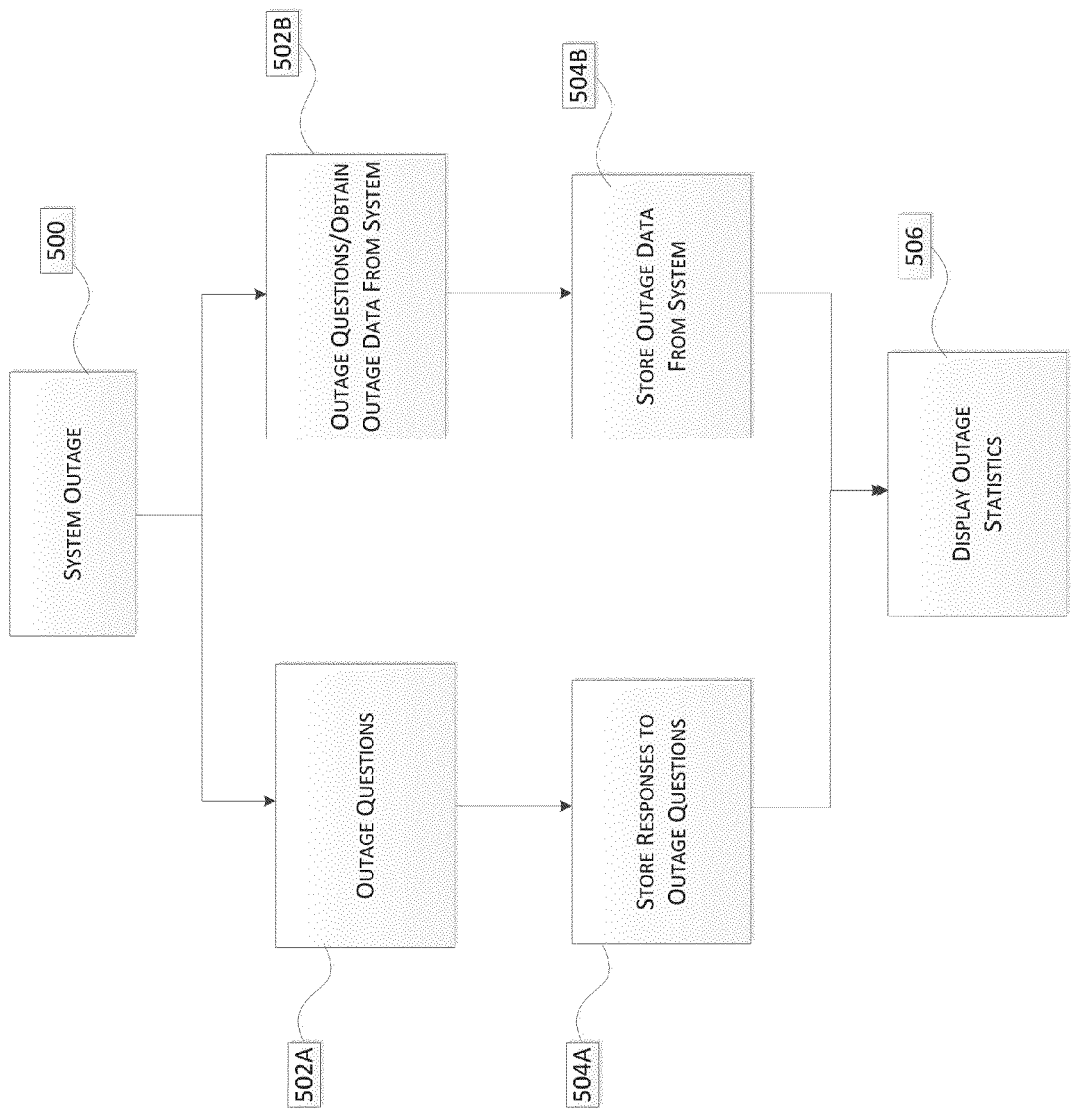
FIG. 4 illustrates a schematic of an exemplary process of collecting and outputting outage information.

FIG. 4 depicts an exemplary schematic of a process of an outage entering and reporting process. In this example, an outage may occur at step 500, which could be planned outage or could be caused by a system malfunction or server errors. Where an outage occurs at step 500, the system can send a listing of inquiries to a user to obtain information about the outage at step 502A. Additionally the system can download certain outage system data directly from the system at step 502B as a part of an outage log directly from the system. The outage data responses provided by the user at the user interface in step 502A can then be stored into the system, for example a centralized database, at step 504A for later viewing. Additionally the outage data obtained directly from the system can be stored at step 504B into the centralized database. The centralized database can associate all of the data together across all of the systems in a consistent readable format, such that the outage data and statistics can then be viewed together at step 506 for diagnosing the errors in the system.

Figure 2A:
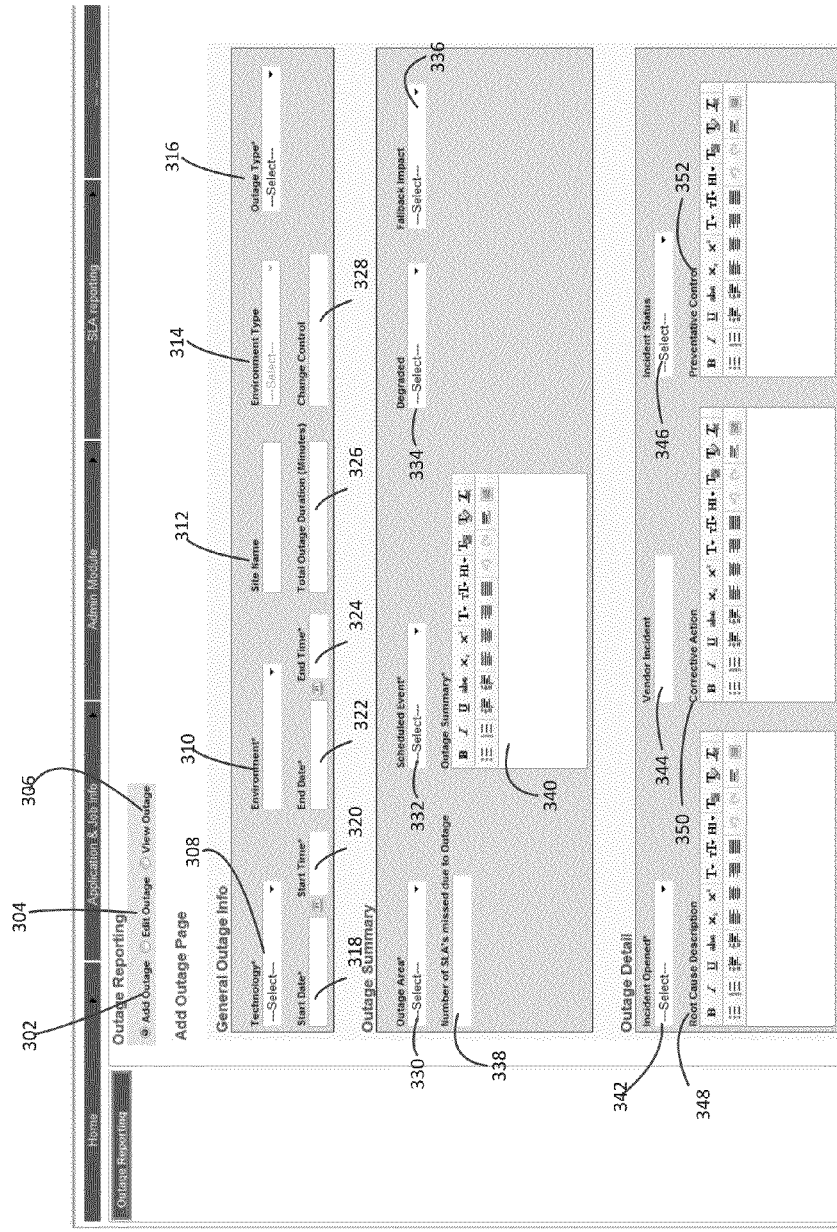
FIG. 2A illustrates an exemplary user interface for collecting outage information.
Figure 2B:
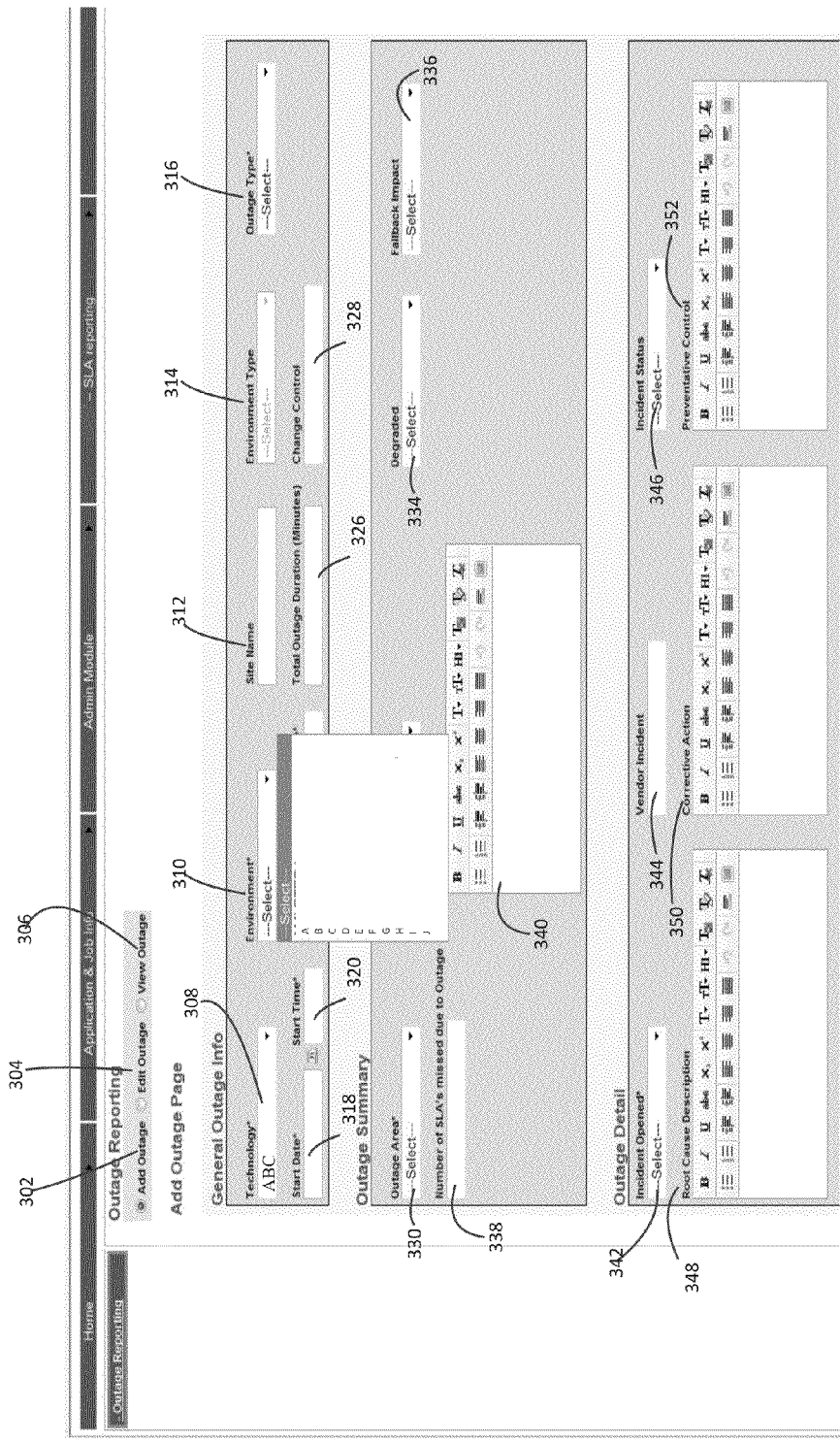
FIG. 2B illustrates the exemplary user interface for collecting outage information of FIG. 2A.

FIGS. 2A and 2B depict an example of a user interface, where the user can report an outage such as in step 502A. The user interface can be implemented as a web-based application that is accessible from various devices or terminals via any network, such as LAN (e.g. an intranet), a WAN (e.g. the Internet) or as discussed herein. The web-based application can reside at a web server that provides or houses the interface, and the user interface can be configured as an interactive, web-based form for entering in information.

In the example shown in FIGS. 2A and 2B, the user can be provided with three options on the user interface such as, "Add Outage" 302, "Edit Outage" 304, and "View Outage" 306. In this way, the user interface provides the user with an outage reporting selection, which can include adding information regarding an outage, editing an existing outage such as by updating certain outage parameters, and viewing an existing outage so that the user can either provide details on a new outage report, edit the existing parameters of a previously reported outage, or view and search for previously reported outages.

The user interface example shown in FIGS. 2A and 2B displays the "Add Outage Page" where the user can add a new outage into the system. As depicted in FIGS. 2A and 2B, the user interface can be a web-based interactive form. The user can be provided with the option of adding of an outage, which includes a request of outage information through several inquiries or questions directed to the user regarding, for example, a platform outage of a particular database and receiving the outage information from the user. The Add Outage Page can include a series of questions or inquiries that seek information on three areas of the particular outage, such as, General Outage Info, Outage Summary, and Outage Detail.

The "General Outage Info" can include inquires such as Technology 308, Environment 310, Site Name 312, Environment Type 314 and Outage Type 316. As shown in FIG. 13, these inquiries can be configured as drop-down menus that are populated with predetermined answers. For example as shown in FIG. 3B, the user can only select the various items that are listed in the drop down menus. In this way, the information that is reported can be more consistent when entered into the system or the centralized database. This decreases the chances of entry errors or incompatible selections being made, and improves the data quality by keeping the data consistent. This may reduce the amount of overhead that is spent on re-validation of data post-outage event.

The "General Outage Info" can also include various other reporting items, such as, Start Date 318, Start Time 320, End Date 322, End Time 324, Total Outage Duration (Minutes) 326, and Change Control 328. The time fields, such as, Start Date 318, Start Time 320, End Date 322, End Time 324, Total Outage Duration (Minutes) 326, can be provided with fields that are populated consistently such that the values can be entered into the system in a reliable format. The fields can be configured such that the user can select the time, for example, in a drop-down menu. Any other number of inquiries for needed information can be included in the General Outage Info.

The Outage Summary can include inquires such as Outage Area 330, Scheduled Event 332, Degraded 334, Fallback Impact 336, which can also be configured as drop-down menus. Again, in this way, the information that is reported can be more consistent when entered into the system or into the centralized database. The Outage Summary may also include an inquiry for the Number of SLA's missed due to an outage 338, and Outage Summary 340. The Outage Summary 340 can include a field for the user to describe or summarize in their own words the outage that occurred.

The Outage Detail may include information such as whether the incident was opened, (Incident Opened 342), for example, whether a ticket or label has been associated with the outage, whether the incident was a Vendor Incident 344, and the Incident Status 346. The Outage Detail may also include fields for the user to enter the Root Cause Description 348, the Corrective Action 350, and the Preventative Control 352.

However, alternatively or in addition, as in step 502B, certain aspects of the outage information such as the Technology 308, Environment 310, Site Name 312, Environment Type 314, Start Date 318, Start Time 320, End Date 322, End Time 324, Total Outage Duration (Minutes) 326 and other outage information can be entered into the database automatically as a part of an outage log that is generated when an outage occurs. For example, the various systems and services, e.g. database servers, ETL servers, Teradata servers, and warehouse databases can be monitored for an outage. Once an error or lack of service is detected, an error log entry could be generated, and the log entry regarding system outage could be brought automatically into the database at step 504B. Alternatively or in conjunction with the above process, the system can constantly pull or receive outage information through a batch process every predetermined amount of time and the log could be sent via an NDM, FTP or the like. A user could then view or edit the outage information to supplement the details of the outage as needed through a user interface as discussed herein.

The information collected through the user interface including the General Outage Info, Outage Summary, and Outage Detail information can then be stored into a centralized database for viewing at a later time. The received outage information from the user can be associated with a particular system or can be associated with any one or more of the Technology 308, Environment 310, Site Name 312, Environment Type 314, Outage Type 316 and other fields. This can provide the user with the ability to locate certain outage data by searching the data by one or more of these fields. The system described herein may help to preserve and organize the outage data for reviewing and diagnosing the outages. The system can also assist with trending and tracking in viewing the information from the centralized database and allows the ability to unite the data across other databases.

Figure 3:
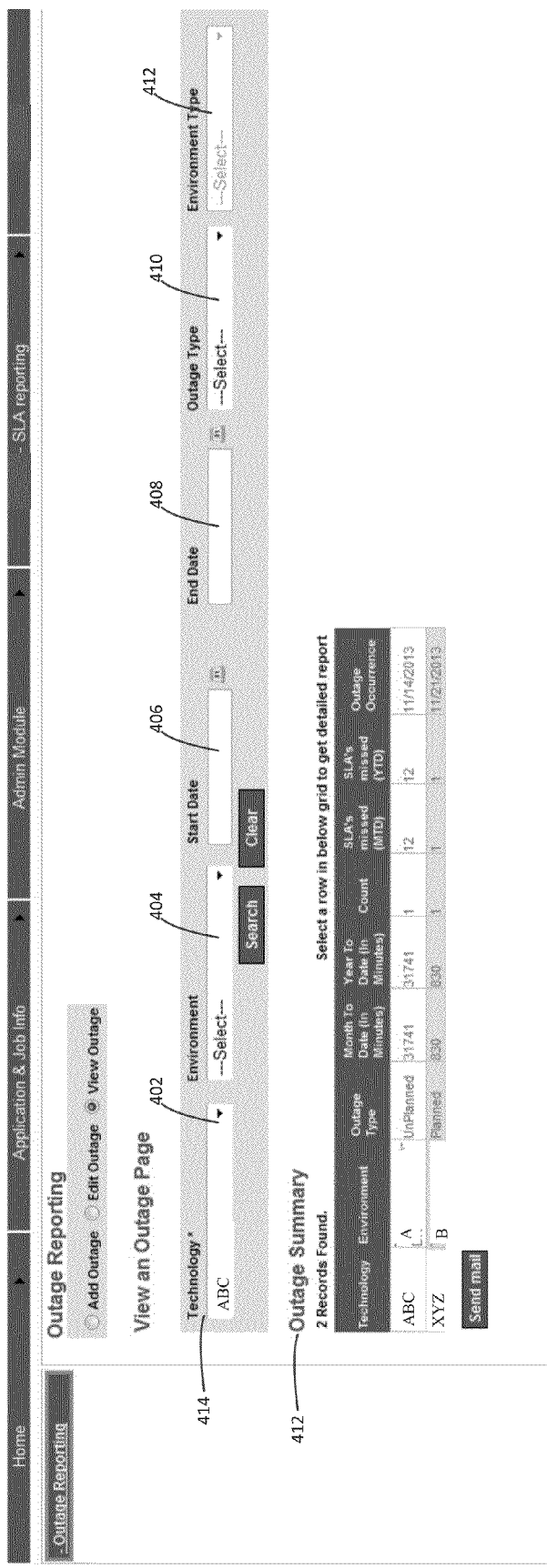
FIG. 3 illustrates an exemplary user interface for searching outage information.

An example of the user interface for viewing the outage reports as in step 506 is shown in FIG. 3. In one example, the viewing of the existing outage may include providing the user with a search field 414 for selecting an existing outage and displaying information regarding the selected existing outage. For example, the user can search the outage statistics by Technology 402, Environment 404, Start Date 406, End Date 408, Outage Type 410, and Environment Type 412. As shown in FIG. 3, the user interface for viewing the outage reports can also include drop down enabled lookup tables and can allow users to view outage statistics in various formats in an easy and exportable view. In this way, in one example, the user can group the outage reports by any one of the Technology 402, Environment 404, Start Date 406, End Date 408, Outage Type 410, or the Environment Type 412.

In this example, the user selected to view the outages by the Technology 402. As shown in FIG. 3, the Outage Summary 414 can display the results by Technology 402. The Outage Summary can include various information regarding the technology, environment, outage type, cumulative time of the outage month to date or year to date, count (number of times the particular environment went down), number of SLAs missed due to outage both month to date and year to date, and the outage occurrence date. The number of SLA's missed can be the number of Operational SLAs that are missed due to an outage. The user may also select a particular row to receive detailed reporting of outage information. The detailed reporting of outage information may include, for example, the technology, environment, site name, environment type, outage type, start date, start time, end date, end time, total outage duration, change control, whether the event was scheduled, degraded status, fallback impact, number of SLAs missed due to outage, whether the incident has been opened, vendor incident, incident status, outage area, outage summary, root cause description, corrective action, preventative control personnel, user that created the entry, and any user that has modified the entry. The functionality of the user interface and the reporting system can also be configured to be platform agnostic such that the parameters are consistent across the generated reports and any platform can be included in the outage reporting.

In this way, the statistics can be monitored leading up to an outage. The data can be queried, for example, just prior to an outage, such that the specific users, the data being accessed and various other information can be accessed just prior to the outage. The system enables trending and tracking of data, and the personnel managing the systems can understand the issues better and potentially quicker through a centralized system for modeling and displaying the outage statistics. The system can also assist in diagnosing reoccurring outages in that the outage data can be trended to locate particular activity that leads to outages and server issues.

In one example, if a mysterious issue occurs where a database becomes unresponsive, the Outage Summary data can be accessed by the user via a simple query and the user can pull up the outage based on the timing of the outage. The user can see a snap shot of the system resources from a centralized database prior to the outage to diagnose the system, for example, based on the timing of the outage. In another example, if a planned outage occurs and the system or server continuously reboots, the outage data, such as the system resources, can be reviewed to determine the cause of the continuous rebooting. In another example, if a particular server crashes at a certain time of year, such as at the end of the third quarter, the outage data can be reviewed to determine potential causes of the system crashes based on various data points in the system.

In another embodiment, requirements of a SLA could be exported into the system or the centralized database, and the statistics and parameters from the outage report could be compared with the specific requirements of the SLA. The correlation can assist with determining whether certain SLA requirements have been met. In one example, the system could be configured to calculate or export specifics regarding accountability pertaining to certain contract terms in SLAs.

For example, the terms of the SLA could be entered into the database using lookup tables and various fields similar to the embodiments disclosed in FIGS. 2A, 2B, and 3. The terms of the SLA could be updated as the terms and conditions of the SLAs change on a periodic basis, e.g. monthly, quarterly, or yearly. The system could also be configured to automatically compare the values between the terms of the SLA and the outage reporting to determine whether the SLA conditions are met. For example, an algorithm could be implemented where the system could determine whether a server outage exceeds an amount of time required by the SLA. Additionally the contract penalty specific in the SLA could be automatically obtained through the centralized database for a future request or inquiry from a particular vendor.

The outage entering and reporting process and the user interface and reporting system can be beneficial to reporting platform outages, for example, on a database service. The user interface and reporting system can provide for a common entry point or a controlled user interface where the user can provide the various outage details as discussed herein and the outage details can be stored in the centralized database for later review. This can provide for an efficient process of reviewing SLAs and vendor requirements across various SLAs to help minimize financial losses. Providing a consistent user interface for outage reporting may result in fewer instances of non-matching data and data entry errors and/or fast-finger type errors. Therefore, less time may be spent by personnel in correcting and reformatting the data such that it can be utilized in fixing system issues or evaluating SLAs and vendor requirements.

Additionally, the outage statistics can be monitored and various items can be viewed prior to the outage. This may allow for trending and tracking where the user can better determine what the issues were at the time of the outage. The statistics can also be viewed in various ways to gain differing perspectives for accurate and quick assessments of the data. In addition, because the reporting user interface assists in ensuring that the data is accurately entered into the system, the data can be reported accurately to personnel responsible for the various systems and outside vendors for assessment, trouble shooting, and repairing of the malfunctioning systems. Also the data can be preserved such that it becomes fixed into the database can be accurately viewed or communicated to vendors. The system can also be effective in helping to make sure that vendors are meeting the requirements of a particular SLA by comparing outage statistics to the particular terms of the SLA.

An example method of reporting an outage in a system may include providing a user with an outage reporting selection including adding of an outage, editing an existing outage, and viewing an existing outage. The adding of an outage includes requesting outage information from the user regarding a platform outage and receiving the outage information from the user. Viewing of the existing outage can include providing the user with a search field for selecting an existing outage and displaying information regarding the selected existing outage. The search field may include one of technology, environment, start date, end date, and outage type.

The method may further include storing the outage information from the user in a centralized database for viewing at a later time and automatically storing outage information after an outage occurs. The adding of an outage may include presenting a series of questions to the user at a user interface, and the series of questions may include at least one drop-down menu with predetermined answers. The method may further include associating the received outage information from the user with a particular system.

Another example method of providing a user interface may include providing an outage reporting form for reporting an outage. The outage reporting form can include requesting outage information from the user regarding a platform outage for receiving the outage information from the user, providing an option for viewing previous outage information, providing a search field for selecting a previous outage to view the previous outage information, and displaying previous outage information regarding the selected previous outage.

Another exemplary method may include providing a user interface, the user interface can include an outage reporting form for reporting an outage, the outage reporting form including requesting outage information from the user regarding a platform outage for receiving the outage information from the user, providing an option for viewing previous outage information, and displaying previous outage information regarding the selected previous outage.

In another example, an apparatus comprising: a processor; and a memory for storing computer readable instructions that, when executed by the processor, can cause the apparatus to perform the methods discussed herein. In another example, one or more non-transitory computer-readable media may have instructions stored thereon that, when executed, cause at least one computing device to perform one or more aspects of the methods discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An apparatus comprising:
    a processor; and
    memory storing computer readable instructions executed by the processor, cause the apparatus to:
        provide a user with an outage reporting selection including adding of a database outage;
        wherein the adding of an outage includes requesting and receiving a first set of information from the user regarding the database outage of a database storage memory;
        download a second set of information regarding the database outage directly from an outage log of the database storage memory associated with the database outage;
        store the first set of information in a centralized database storage memory;
        store the second set of information in the centralized database storage memory;
        associate the first set of information and the second set of information based, at least in part, on the database associated with the database outage;
        store a plurality of requirements associated with an SLA in the centralized database; and
        compare the first set of information and the second set of information associated with the database outage with the plurality of requirements to determine whether the plurality of requirements associated with the SLA have been met.

2. The apparatus of claim 1 wherein the instructions executed by the one or more processors further cause the apparatus to automatically download and store the second set of information directly from the outage log of the database associated with the database outage after the database outage occurs.

3. The apparatus of claim 1 wherein the adding of an outage includes a series of questions presented to the user via the outage reporting selection.

4. The apparatus of claim 3 wherein the series of questions includes at least one drop-down menu with predetermined answers.

5. The apparatus of claim 1 further comprising associating the first set of information and the second set of information with a system.

6. The apparatus of claim 1 wherein the instructions executed by the one or more processors further cause the apparatus to provide the user with the outage reporting selection including viewing an existing database outage, wherein the viewing of the existing database outage includes providing the user with a search field for selecting the existing database outage and viewing information relating to the existing database outage, and wherein the search field includes one of technology, environment, start date, end date, and outage type.

7. A computer-implemented method for providing a user interface comprising:
    providing a processor; and
    providing a memory storing computer readable instructions executed by the processor, cause the apparatus to:
        provide an outage reporting form for reporting a database outage;
        wherein the outage reporting form includes requesting and receiving a first set of information from the user regarding the database outage of a database storage memory, responsive to a series of questions presented to the user via the outage reporting form;
        download a second set of information regarding the database outage directly from an outage log of the database storage memory associated with the database outage;
        store the first set of information in a centralized database storage memory;
        store the second set of information in a centralized database storage memory;
        associate the first set of information and the second set of information based, at least in part, on the database associated with the database outage;
        store a plurality of requirements associated with an SLA in the centralized database;
        compare the first set of information and the second set of information associated with the database outage with the plurality of requirements to determine whether the plurality of requirements associated with the SLA have been met; and
        responsive to determining that at least one of the plurality of requirements have not been met, determine a plurality of SLA violations associated with the database outage.

8. The method of claim 7 further comprising automatically downloading and storing the second set of information directly from the outage log of the database associated with the database outage after the database outage occurs.

9. The method of claim 7 wherein the outage reporting form includes a series of questions presented to the user at the user interface.

10. The method of claim 9 wherein the series of questions includes at least one drop-down menu with predetermined answers.

11. The method of claim 7 further comprising associating the first set of information and the second set of information with a system.

12. The method of claim 8 further comprising providing a search field for selecting a previous database outage to view information relating to the previous database outage, wherein the search field includes one of technology, environment, start date, end date, and outage type.

13. One or more non-transitory computer-readable media having instructions stored thereon that cause at least one computing device to:
    provide a user interface, the user interface comprising an outage reporting form for reporting a database outage, the outage reporting form including requesting and receiving a first set of information from the user regarding the database outage of a database storage memory;

download a second set of information regarding the database outage directly from an outage log of the database storage memory associated with the database outage;

store the first set of information in a centralized database storage memory;

store the second set of information in the centralized database storage memory;

associate the first set of information and the second set of information based, at least in part, on the database associated with the database outage;

store a plurality of requirements associated with an SLA in the centralized database;

compare the first set of information and the second set of information associated with the database outage with the plurality of requirements to determine whether the plurality of requirements associated with the SLA have been met; and responsive to determining that at least one of the plurality of requirements have not been met, determine a plurality of SLA violations associated with the database outage.

14. The one or more non-transitory computer-readable media of claim 13, wherein the instructions further cause the at least one computing device to automatically download and store the second set of information directly from the outage log of the database associated with the database outage after the database outage occurs.

15. The one or more non-transitory computer-readable media of claim 13 wherein the outage reporting form includes a series of questions presented to the user at the user interface.

16. The one or more non-transitory computer-readable media of claim 15 wherein the series of questions includes at least one drop-down menu with predetermined answers.

17. The one or more non-transitory computer-readable media of claim 13, wherein the instructions further cause the at least one computing device to provide a search field for selecting a previous database outage to view information relating to the previous database outage.

18. The apparatus of claim 1 wherein the instructions executed by the one or more processors further cause the apparatus to:
download a third set of information regarding a second database outage directly from a second outage log of a second database storage memory associated with the second database outage;
store the third set of information in the centralized database storage memory;
provide the user with the outage reporting selection including editing an existing database outage, wherein the existing database outage is the second database outage;
request and receive a fourth set of information regarding the second database outage of the second database storage memory, wherein the fourth set of information is supplementary to the third set of information stored in the centralized database storage memory;
store the fourth set of information in the centralized database storage memory; and
associate the third set of information and the fourth set of information based, at least in part, on the second database storage memory associated with the second database outage.

19. The method of claim 7 further comprising:
downloading a third set of information regarding a second database outage directly from a second outage log of a second database storage memory associated with the second database outage;
storing the third set of information in the centralized database storage memory;
providing the user with an option for editing an existing database outage, wherein the existing database outage is the second database outage;
requesting and receiving a fourth set of information regarding the second database outage of the second database, wherein the fourth set of information is supplementary to the third set of information stored in the centralized database storage memory;
storing the fourth set of information in the centralized database storage memory; and
associating the third set of information and the fourth set of information based, at least in part, on the second database storage memory associated with the second database outage.

20. The one or more non-transitory computer-readable media of claim 13, wherein the instructions further cause the at least one computing device to:
download a third set of information regarding a second database outage directly from a second outage log of a second database storage memory associated with the second database outage;
store the third set of information in the centralized database storage memory;
provide the user with an option for editing an existing database outage, wherein the existing database outage is the second database outage;
request and receive a fourth set of information regarding the second database outage of the second database, wherein the fourth set of information is supplementary to the third set of information stored in the centralized database storage memory;
store the fourth set of information in the centralized database storage memory; and
associate the third set of information and the fourth set of information based, at least in part, on the second database storage memory associated with the second database outage.

* * * * *